(12) United States Patent
Saegesser

(10) Patent No.: US 8,082,671 B2
(45) Date of Patent: Dec. 27, 2011

(54) HAND-HELD JIGSAW WITH CLAMPING DEVICE FOR RECIPROCATING TOOL, IN PARTICULAR A JIGSAW BLADE

(75) Inventor: Daniel Saegesser, Langenthal (CH)

(73) Assignee: Robert Bosch GmbH, Stuttgart (DE)

( * ) Notice: Subject to any disclaimer, the term of this patent is extended or adjusted under 35 U.S.C. 154(b) by 377 days.

(21) Appl. No.: 12/443,839

(22) PCT Filed: Apr. 7, 2008

(86) PCT No.: PCT/EP2008/054134
§ 371 (c)(1),
(2), (4) Date: Apr. 1, 2009

(87) PCT Pub. No.: WO2008/148593
PCT Pub. Date: Dec. 11, 2008

(65) Prior Publication Data
US 2010/0000100 A1    Jan. 7, 2010

(30) Foreign Application Priority Data
Jun. 6, 2007 (DE) .......................... 10 2007 026 444

(51) Int. Cl.
*B27B 19/02* (2006.01)
*B23D 51/10* (2006.01)
(52) U.S. Cl. ............ 30/392; 30/335; 83/699.21; 279/71
(58) Field of Classification Search ............. 83/699.21; 30/335, 337, 338, 392–394; 279/71, 77, 279/78, 81, 82, 87
See application file for complete search history.

(56) References Cited

U.S. PATENT DOCUMENTS

| 5,306,025 A * | 4/1994 | Langhoff ........................ 279/90 |
| 5,487,221 A | 1/1996 | Oda et al. |
| 6,735,876 B2 | 5/2004 | Hirabayashi |
| 2008/0289198 A1 * | 11/2008 | Kaiser et al. .................... 30/394 |

FOREIGN PATENT DOCUMENTS

| DE | 93 05 188.3 | 6/1993 |
| DE | 195 04 432 | 8/1995 |
| DE | 198 19 528 | 4/1999 |
| DE | 602 05 146 | 5/2006 |
| EP | 0 623 413 | 11/1994 |
| GB | 2 338 205 | 12/1999 |
| JP | 200227301 | 9/2002 |
| JP | 2002273701 | 9/2002 |

* cited by examiner

Primary Examiner — Stephen Choi
(74) Attorney, Agent, or Firm — Michael J. Striker

(57) ABSTRACT

A hand-held power jigsaw includes a clamping device which has an insertion slot (26) for a shaft (153) of the tool and has a transverse aperture (27) extending transversely to the insertion slot (26) and opening out into it. A clamping element (19) for clamping the shaft (153) can slide in the transverse aperture (27) and travels into the insertion slot (26) at one end and protrudes out from the transverse aperture (27) at the other end. A centering piece (18) has a rotatable clamping sleeve (20) equipped with a clamping curve (28) that slides the clamping element (19), equipped with a clamping spring, which engages the clamping sleeve (20) and rotates the clamping sleeve (20). The centering piece (18) has two transverse apertures (27) and in which two clamping elements (19) are supported opposite each other in a movable fashion.

8 Claims, 5 Drawing Sheets

HAND-HELD JIGSAW WITH CLAMPING DEVICE FOR RECIPROCATING TOOL, IN PARTICULAR A JIGSAW BLADE

CROSS-REFERENCE

The invention described and claimed hereinbelow is also described in PCT/EP2008/054134, filed Apr. 7, 2008 and DE 10 2007 026 444.7, filed on Jun. 6, 2007. This German Patent Application, whose subject matter is incorporated here by reference, provides the basis for a claim of priority of invention under 35 U.S.C. 119 (a)-(d).

BACKGROUND OF THE INVENTION

The invention is based on a hand-held power jigsaw with a clamping device for a reciprocating tool, in particular a jigsaw blade.

A known hand-held power jigsaw has a toolless clamping device for a jigsaw blade (DE 602 05 146 T2). This clamping device has a centering piece affixed to the lifting rod, with an axial insertion slot for a shaft of a jigsaw blade as well as a cup-shaped clamping sleeve that is situated concentric to the centering piece and is able to rotate in relation to the centering piece. The cylindrical centering piece contains a radially extending transverse aperture, which is oriented transversely to the insertion slot and opens onto the outer circumference of the centering piece and into the insertion slot. A clamping element is inserted into the transverse aperture and at one end, protrudes from the transverse aperture with a head that is larger than the transverse aperture and at the other end, protrudes into the insertion slot. The part of the clamping element protruding into the insertion slot is provided with an insertion bevel so that the jigsaw blade shaft inserted into the insertion slot from beneath can slide the clamping element outward, transversely in relation to the insertion slot. To slide the clamping element in the opposite direction, the clamping sleeve has a clamping curve, which extends over a rotation angle range of the clamping sleeve and whose radius decreases continuously over the rotation angle range. The clamping curve rests against the head of the clamping element and as the clamping sleeve is rotated, slides the clamping element deeper and deeper into the insertion slot. One end of a prestressed torsion spring engages an intermediate piece and its other end engages the clamping sleeve; the torsion spring strives to rotate the clamping sleeve in a direction such that the clamping curve slides the clamping element into the insertion slot to its maximum depth.

In order to insert the jigsaw blade, the clamping sleeve is rotated by means of a manually rotatable collar counter to the restoring force of the torsion spring so that the clamping curve lifts away from the head of the clamping element and as the jigsaw blade is inserted, it is able to move the clamping element out of the insertion slot in a radially outward direction by means of the insertion bevel. The clamping element is slid a greater or lesser distance outward, depending on the thickness of the saw blade. If the collar is released again, then the reverse rotation of the clamping sleeve produced by the restoring force of the torsion spring causes the clamping curve to slide along the head of the clamping element and press the clamping element against the shaft of the jigsaw blade, which for its part, rests against the wall of the centering piece opposite from the clamping element in the insertion slot. At the end of the reverse rotation of the clamping sleeve produced by the torsion spring, the saw blade is clamped in a frictionally engaging fashion between the centering piece and the clamping element.

In the bottom of the cup-shaped clamping sleeve, a slot is provided, whose length is greater than the width of a transverse piece protruding from the shaft of the jigsaw blade so that the transverse piece can be slid through the slot in the bottom. In the release position of the clamping device, which is manually set in opposition to the restoring force of the torsion spring, this transverse piece is flush with the insertion slot. The reverse rotation of the clamping sleeve produced by the torsion spring causes the slot in the bottom of the clamping sleeve to rotate in relation to the insertion slot in the centering piece so that the transverse piece on the shaft of the jigsaw blade can rest against the bottom of the clamping sleeve and a withdrawal of the saw blade is prevented.

SUMMARY OF THE INVENTION

The reciprocating tool clamping device according to the invention has the advantage that on the one hand, an exactly symmetrical clamping of the tool is achieved in which any tool, regardless of the thickness or gauge of its clamping shaft, is positioned so that its central symmetry line is aligned with the axis of the lifting rod of the driving machine. By contrast with the known clamping device, tools or jigsaw blades of different thicknesses do not result in any lateral offset between the central symmetry line of the jigsaw blade and the axis of the lifting rod. On the other hand, when the tool has been ejected, the spacer block keeps the clamping device in a parked position in which it is possible to insert the tool without manually actuating the clamping sleeve. As the tool is inserted, the spring-loaded spacer block is gradually slid out of the insertion slot in opposition to the spring force and the clamping elements clamp onto the shaft of the tool due to the clamping spring pressure that is exerted via the clamping curves. A manual rotation of the clamping sleeve is only required to eject the tool from the clamping device. This manual rotation releases the clamping force of the two clamping elements on the shaft of the tool and the spring-loaded spacer block slides the tool out of the insertion slot while simultaneously being gradually inserted into the insertion slot so that the clamping elements, which are still subjected to the clamping spring pressure via the clamping curves, clamp onto the spacer block and the clamping device is once again ready to receive the next tool.

BRIEF DESCRIPTION OF THE DRAWINGS

The invention will be explained in greater detail below in conjunction with a description of an exemplary embodiment shown in the drawings.

DETAILED DESCRIPTION OF THE PREFERRED EMBODIMENTS

Figure 1:
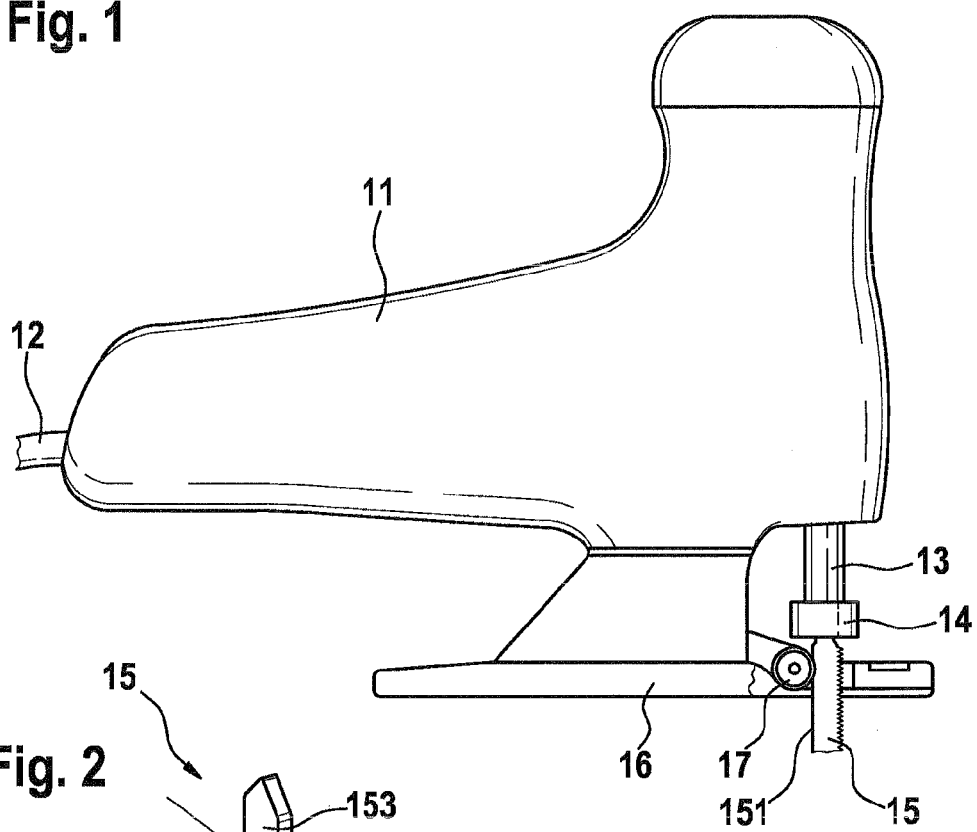
FIG. 1 is a side view of a power jigsaw with a lifting rod, a clamping device, and a jigsaw blade clamped into the clamping device; only a part of the blade is visible in the drawing.

The hand-held power jigsaw shown in a side view in FIG. 1, which is embodied in the form of a sabre saw as an exemplary embodiment of a driving machine with a reciprocating tool, has a machine housing 11 containing an electric motor, which is supplied with power via an electric cable 12, and a transmission, which converts the rotary motion of the electric motor into a stroke motion of a lifting rod 13. At the lower end of the lifting rod 13, a clamping device 14 is provided for a jigsaw blade 15 as an exemplary embodiment for a reciprocating tool. The jigsaw blade 15 protrudes through an opening in a baseplate 16, which is fastened to the housing in an angularly adjustable fashion and allows the power jigsaw to rest on a work piece. During the stroke motion, the blade spine 151 of the jigsaw blade 15 rests against a support roller 17 mounted to the machine housing 11.

Figure 2:
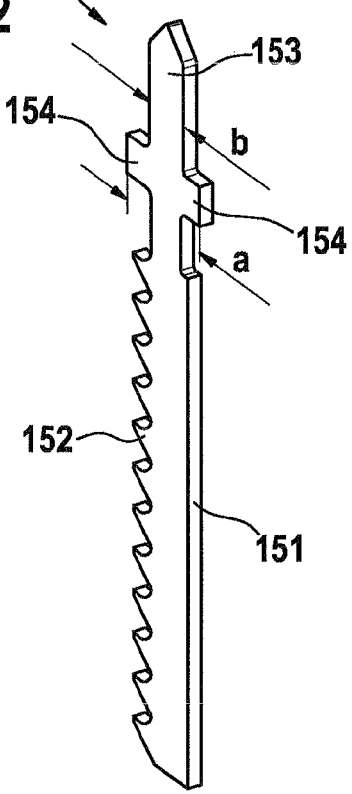
FIG. 2 is a perspective view of the jigsaw blade in FIG. 1.

FIG. 2 shows a perspective view of the jigsaw blade 15. A row of saw teeth 152 is provided on the front edge oriented away from the blade spine 151. A shaft 153, which is of one piece with the jigsaw blade 15 and has two laterally protruding dogs 154, is used to clamp the blade into the clamping device 14. The shaft 153 of the jigsaw blade 15 has a width b and a distance a between the outer edges of the dogs 154. The shaft 153 has an end that tapers to a point.

Figure 3:
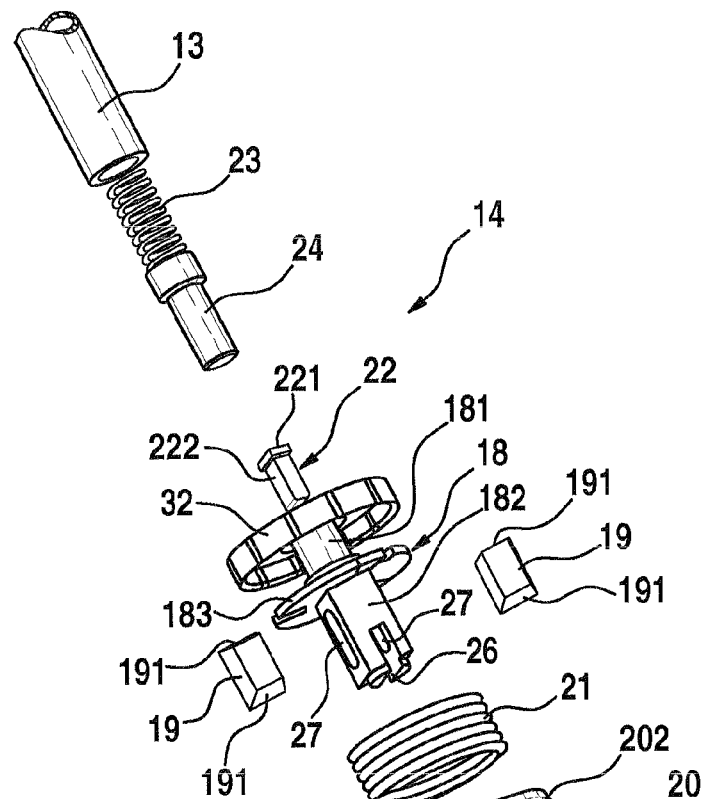
FIG. 3 is an exploded depiction of the clamping device with the jigsaw blade in FIG. 1.
Figure 5:
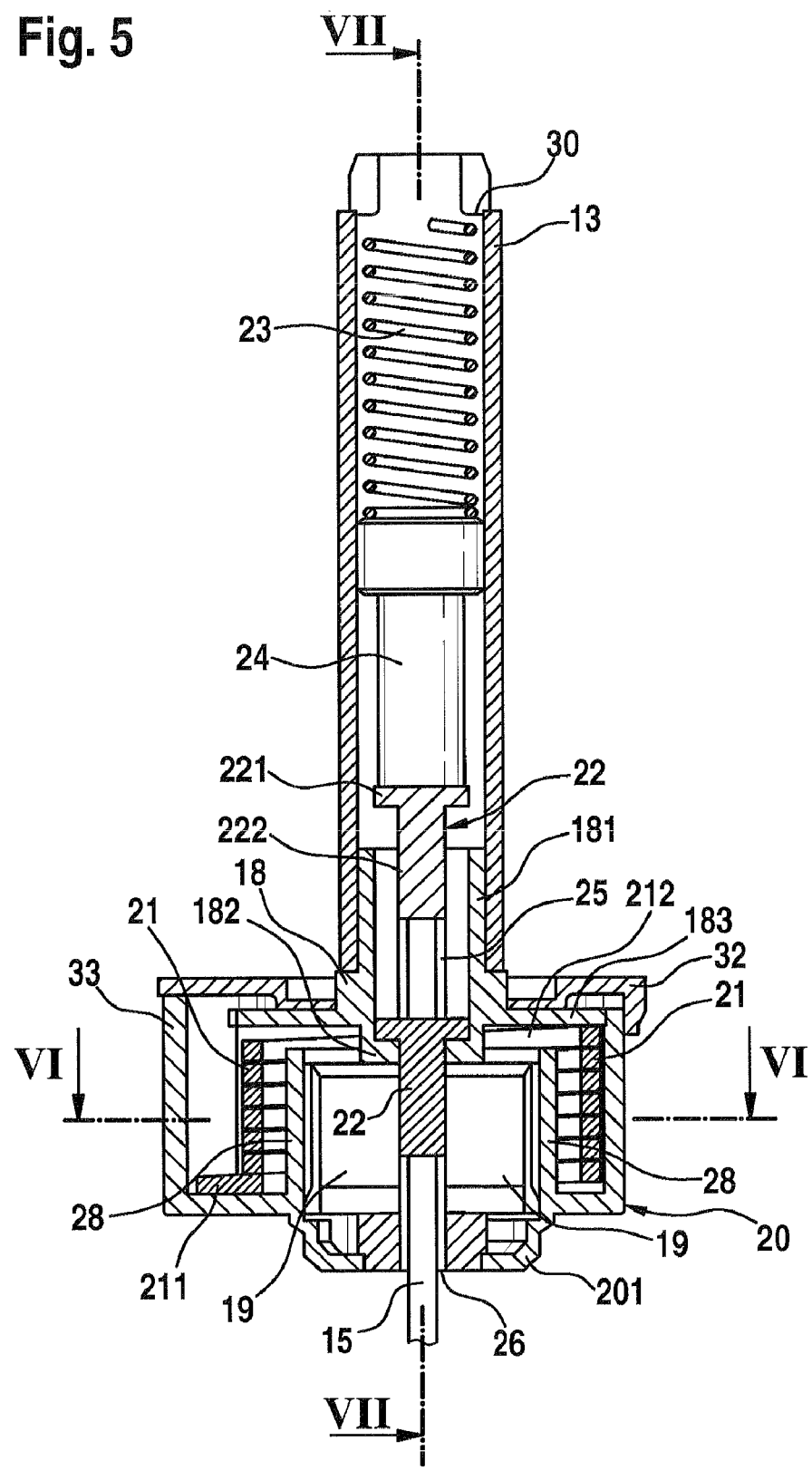
FIG. 5 is a longitudinal section through the assembled clamping device according to FIG. 3, which is attached to the lifting rod.
Figure 6:
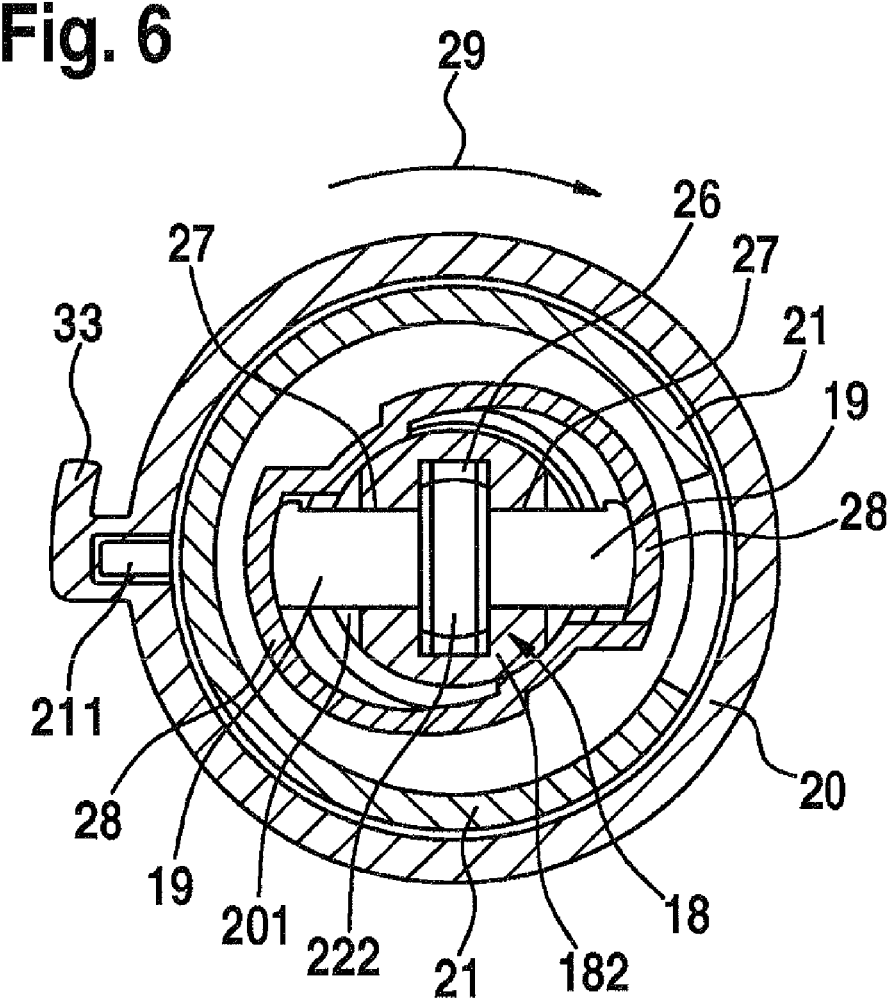
FIG. 6 is a section along line VI-VI in FIG. 5.
Figure 7:
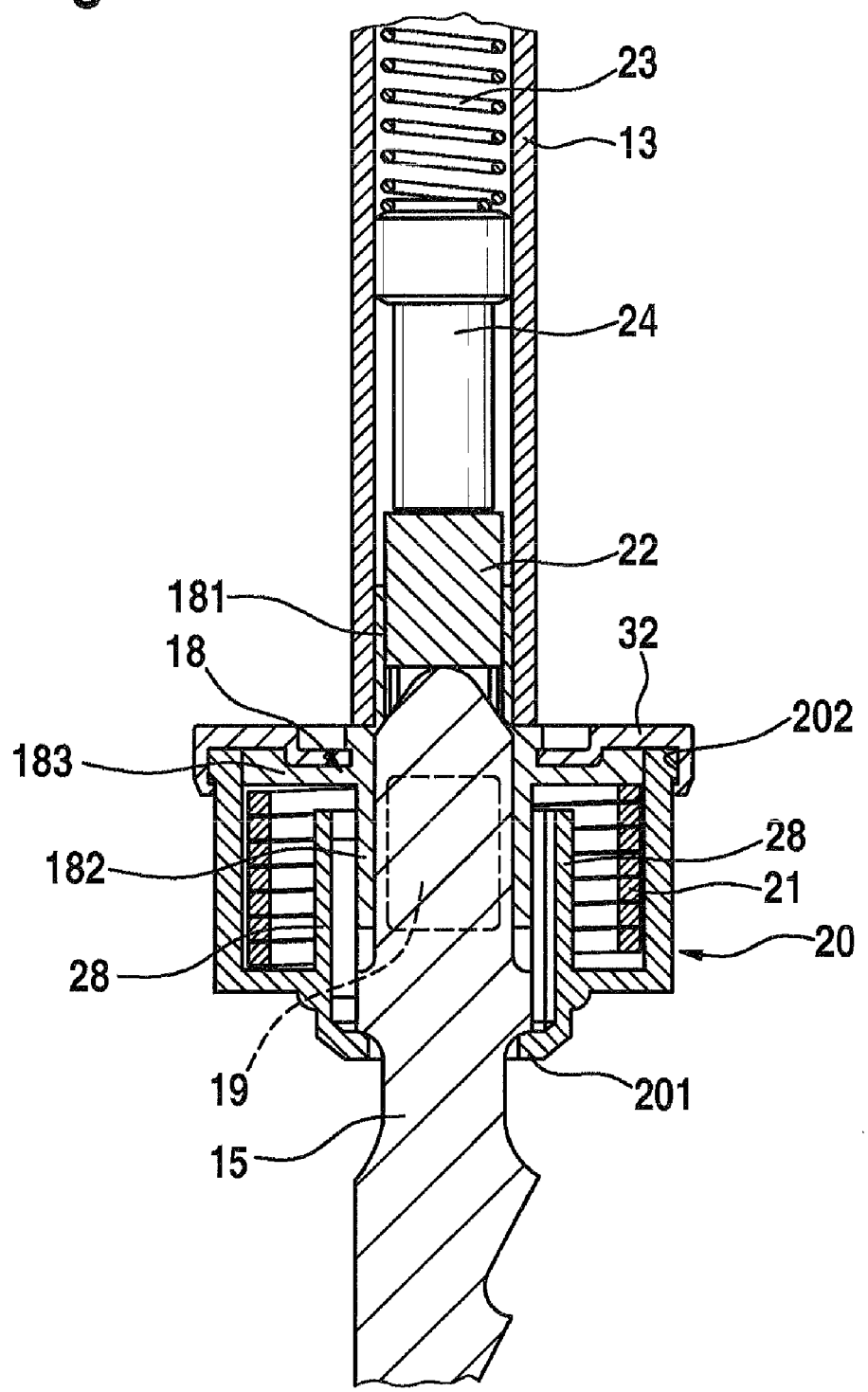
FIG. 7 is a section along line VII-VII in FIG. 5.

The clamping device 14 fastened to the lifting rod 13 is shown in an exploded depiction in FIG. 3 and in various sectional depictions in FIGS. 5 through 7. It has a centering piece 18, two clamping elements 19, a cup-shaped clamping sleeve 20 with a cup bottom 201, a torsion spring 21, a spacer block 22, and a compression spring 23. In the exemplary embodiment of the clamping device 14 shown, an additional spacer 24 is provided, but this can be omitted so that the compression spring 23 engages the spacer block 22 directly instead of indirectly via the spacer 24.

The centering piece 18 has two differently embodied sections situated one after another: an upper section in the form of a hollow cylinder 181 and a lower section in the form of a block 182 that is slightly rounded at the sides. Between the hollow cylinder 181 and the block 182, there is an integrally joined annular flange 183 with an outer diameter that is slightly less than the inner diameter of the clamping sleeve 20. Two guide grooves 25 are provided for the spacer block 22, situated diametrically opposite each other inside the hollow cylinder 181 of the centering piece 18. The outer diameter of the hollow cylinder 181 is dimensioned so that the hollow lower end of the lifting rod 13 can fit over it with form-locked engagement. In the block 182, an insertion slot 26 for the jigsaw blade 15 is provided, which extends into the hollow cylinder 181 and opens out at the end of the block 182 oriented away from the hollow cylinder 181. Perpendicular to the insertion slot 26, two transverse apertures 27 that are aligned with each other are provided in the block 182, each opening into the insertion slot 26. Each of the transverse apertures 27 accommodates one of the two clamping elements 19 in a movable fashion; the clamping elements 19 are dimensioned so that on one side, they protrude into the insertion slot 26 and on the other side, they protrude out from the block 182 of the centering piece 18. Each clamping element 19 is provided with insertion bevels 191 at its upper and lower ends, at least in the region that protrudes into the insertion slot 26 (FIG. 3).

The clamping sleeve 20 has two diametrically opposed clamping curves 28 on the inside of the clamping sleeve 20, which are centrosymmetrical to each other in relation to the axis of the clamping sleeve 20. The clamping curves 28 which are integrally joined to the cup bottom 201 of the clamping sleeve 20 are shaped so that their radius decreases continuously in a rotation angle range of approximately 90°. These clamping curves 28 cooperate with the clamping elements 19 so as to slide the clamping elements into the lateral apertures 27 in such a way that the clamping elements 19 are inserted into the insertion slot 26 to a greater or lesser depth depending on the rotary position of the clamping sleeve 20. The torsion spring 21 is situated in the cup-shaped clamping sleeve 20. Its one spring end 211 is affixed to the clamping sleeve 20 and its other spring end 212 is fastened to the centering piece 18 (FIG. 5). The torsion spring 21 is prestressed so that it strives to rotate the clamping sleeve 20 in direction 29 in FIG. 6. When this rotation occurs, the radius reduction of the clamping curves 28 causes the clamping elements 19 to be slid farther and farther into the insertion slot 26 by means of the two clamping curves 28.

The spacer block 22, which is shown in an upper and lower position in FIG. 5, is T-shaped in profile, with a head 221 and a shaft 222 that is rectangular in cross section. The shaft 222, which is guided in an axially movable fashion in the guide grooves 25 of the centering piece 18, is dimensioned so that it is able to travel into the insertion slot 26; preferably, it takes up the entire slot width of the insertion slot 26. The lifting rod 13, which has been slid onto the hollow cylinder 181 of the centering piece 18 and fastened to it, contains the compression spring 23, one end of which rests against a stop 30 provided on the inside of the lifting rod 13 and the other end of which rests via the spacer 24 against the head 221 of the spacer block 22. This compression spring 23 spring-loads the spacer block 22 so that it travels into the insertion slot 26 until its head 221 comes to rest against the centering piece 18 (represented in the lower depiction of the spacer block 22 in FIG. 5).

The cup bottom 201 of the clamping sleeve 20 has a rectangular opening 31 provided in it (FIG. 4) whose one dimension y is slightly greater than the distance a between the outer edges of the two dogs 154 on the shaft 153 of the jigsaw blade 15 and whose other dimension x is slightly greater than the width b of the shaft 153 of the saw blade 15 and is therefore less than the distance a between the outer edges of the dogs. If the clamping sleeve 20 and centering piece 18 are brought into a position relative to each other as shown in FIGS. 5 and 6, in which the prestressing of the torsion spring 21 is at its maximum, then the longer dimension y of the opening 31 extends parallel to the insertion slot 26 in the centering piece 18. If the restoring force of the torsion spring 21 then rotates the clamping sleeve 20 in the direction of the arrow 29, then the opening 31 in the cup bottom 201 of the clamping sleeve 20 also rotates in relation to the insertion slot 26 so that the cup bottom 201 of the clamping sleeve 20 comes to rest underneath the lower surfaces or flanks of the dogs 154 and with a form-locked engagement, prevents the saw blade 15 from being withdrawn.

After the centering piece 18 and the torsion spring 21 are inserted into the clamping sleeve 20 and the spring ends 211 and 212 of the torsion spring 21 have been hooked into place in the clamping sleeve 20 and centering piece 18, the cup opening of the clamping sleeve 20 is closed by means of a sprung cover plate 32 that encompasses the hollow cylinder 181 of the centering piece 18; this cover plate 32 is clipped to a shoulder 202 that extends around the outside on the cup edge of the clamping sleeve 20.

Figure 4:
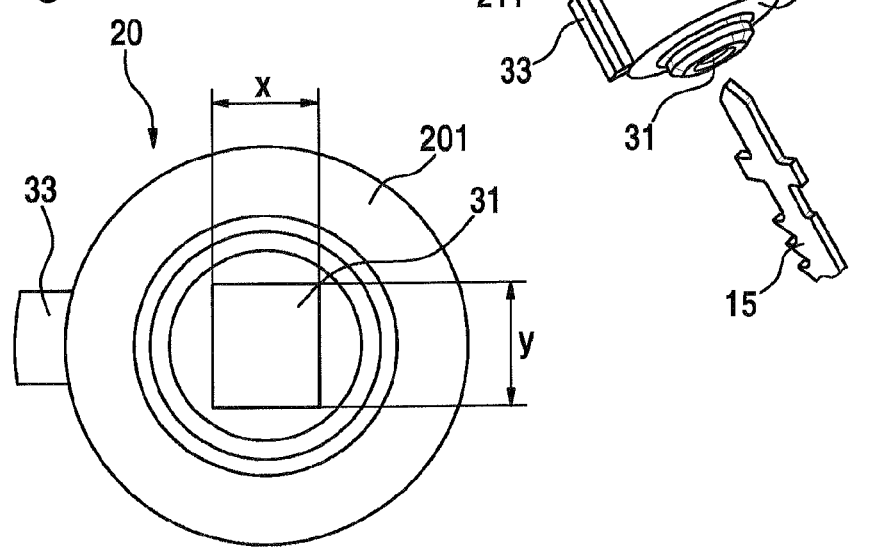
FIG. 4 is enlarged view from the bottom of the clamping sleeve in FIG. 3.

In the so-called parked position of the clamping device 14 shown in FIGS. 5 and 6, the action of the compression spring 23 causes the shaft 222 of the spacer block 22 to travel its maximum distance into the insertion slot 26 between the two clamping elements 19 (see the lower position of the spacer block 22 in which its head 221 rests against the centering piece 18 due to the action of the compression spring 30. The clamping elements 19 are slid their maximum distance out of the insertion slot 26 and protrude their maximum distance out from the centering piece 18. The clamping sleeve 20 is rotated in direction opposite from that of the arrow 29 until the regions of the clamping curves 28 with the maximum radius lie in the vicinity of the clamping elements 19 so that the latter can be slid the maximum distance out from the transverse apertures 27 in the centering piece 18. Since the torsion spring 21 strives to rotate the clamping sleeve 20 in the direction of the arrow 29, the clamping curves 28 press against the outer ends of the clamping elements 19 and lay them in a frictionally engaging fashion against the shaft 222 of the spacer block 22 protruding into the insertion slot 26. The opening 31 in the cup bottom 201 of the clamping sleeve 20 is oriented with its longer dimension y parallel to the insertion slot 26, as shown in FIG. 4 in combination with FIG. 5.

If in this parked position, the jigsaw blade 15 is inserted into the insertion slot 26 from beneath, as shown in FIG. 5, then the end of its shaft 153 strikes against the spacer block 22. If the jigsaw blade 15 is then slid further into the insertion slot 26 in opposition to the force of the compression spring 23, then as the shaft 153 of the jigsaw blade 15 travels further inward, the spacer block 22 is slid further out from the insertion slot 26 until, in its end position, i.e. with a fully inserted shaft 153 of the jigsaw blade 15, it assumes the position shown at the top in FIG. 5, which corresponds to FIG. 7. Due to the constant action of the torsion spring 21 and the clamping curves 28, as the spacer block 22 is slid out, the clamping elements 19 at first continue to press laterally against the spacer block 22 and then press against the shaft 153 of the jigsaw blade 15. If the spacer block 22 is slid all the way out from the region of the clamping elements 19, then the clamping elements 19, through the action of the rotating clamping curves 28, press symmetrically against both sides of the shaft 153 of the saw blade 15 in vise fashion and immobilize the shaft between themselves in a frictionally engaging fashion. Since the shaft 153 of the jigsaw blade 15 is usually thinner than the spacer block 22, the action of the torsion spring 21 is able to rotate the clamping sleeve 20 in the direction of the arrow 29 in FIG. 6 so that in addition to the clamping curves 28, the opening 31 in the cup bottom 201 of the clamping sleeve 20 also rotates in relation to the insertion slot 26, positioning the cup bottom 201 under the edges or flanks of the dogs 154 on the shaft 153 of the jigsaw blade 15 so that the jigsaw blade 15 is now also axially secured in position in a form locked fashion in the clamping device 14 and cannot be withdrawn from the clamping device 14.

In order to eject the clamped jigsaw blade 15 from the clamping device 14, the clamping sleeve 20 must be manually rotated opposite from the direction of the arrow 29 in FIG. 6 until the relative position of the clamping sleeve 20 and centering piece 18 shown in FIG. 6 is once again produced. In this position, the opening 31 assumes its position that axially releases the dogs 154. The clamping sleeve 20 can be rotated by means of a collar that is mounted to the machine housing 11 and engages a protrusion 33 (FIGS. 3, 4, 5, and 6) formed onto the outside of the clamping sleeve 20. Such a manually operated collar is described in DE 602 05 146 T2. Naturally, it is also possible for the clamping sleeve 20 to be manually rotated in a different way. If the clamping sleeve 20 has reached the position shown in FIG. 6, then the compression spring 23 slides or inserts the spacer block 22 back into the insertion slot 26. In the course of this, the spacer block 22 slides the jigsaw blade 15 out of the insertion slot 26 and travels back between the two clamping elements 19.

With the use of a thin saw blade, in order to assure that the spacer block 22 is able to easily travel back between the two clamping elements 19, its free end oriented toward the clamping elements 19 is embodied as tapered or beveled like a wedge.

Due to the insertion of the spacer block 22, the clamping elements 19 hold the clamping sleeve 20 in its parked position shown in FIGS. 5 and 6 in which a new jigsaw blade 15 can be easily inserted into the insertion slot 26 with only one hand, without requiring prior actuation of the clamping sleeve 20.

After insertion of the new jigsaw blade 15, the automatic clamping proceeds as described above.

What is claimed is:
1. A hand-held power jigsaw, comprising:
a clamping device for a tool, the clamping device having an insertion slot (26) provided in a centering piece (18) for a shaft (153) of the tool and a transverse aperture (27) extending transversely to the insertion slot (26) and opening out into said insertion slot (26);
a clamping element (19) for clamping the shaft (153), wherein said clamping element (19) is configured to slide in the transverse aperture (27), travel into the insertion slot (26) at one end, and in particular, protrude out from the transverse aperture (27) at the other end;
wherein the centering piece (18) has a rotatable clamping sleeve (20) equipped with a clamping curve (28) that slides the clamping element (19) equipped with a clamping spring, wherein said clamping spring engages the clamping sleeve (20) and rotates the clamping sleeve (20) in a selected direction of rotation,
wherein the centering piece (18) has two transverse apertures (27) aligned with each other, which each open into the insertion slot (26), and in which two clamping elements (19) are supported opposite each other in a movable fashion;
wherein the clamping sleeve (20) has two clamping curves (28) for sliding the clamping elements (19) toward each other in a clamping position; and wherein the clamping device includes means for sliding the clamping elements (19) into a release position spaced apart from each other, and/or for holding said clamping elements in said release position,
further comprising a spring-loaded spacer block (22) configured to hold the clamping elements (19) in a spaced apart relationship from each other, wherein said spring-loaded spacer block 22 is adapted to slide axially in the insertion slot 26 and move in a direction in which the tool slides out from the centering piece (18), and wherein the clamping elements (19) are supported by the clamping curves (28) against opposing longitudinal sides of said spring-loaded spacer block,
wherein the centering piece (18) is composed of a hollow cylinder (181) and a block (182) integrally joined to each other, said centering piece further having an annular flange (183) in a transition region between the hollow cylinder (181) and the block (182),
wherein the insertion slot (26) reaches to the ends of the block and opens out onto side surfaces of the block (182) oriented away from each other, wherein the transverse apertures (27) are oriented at right angles to said insertion slot (26), wherein said insertion slot (26) and said transverse apertures (27) are arranged in the block (182) to accommodate the clamping elements (19), wherein two diametrically opposed guide grooves (25) for the spacer block (22) are arranged in the hollow cylinder (181),
wherein the block (182) is situated in the clamping sleeve (20), the annular flange (183) extends to the inner wall of the clamping sleeve (20), and the hollow cylinder (181) is encompassed by and attached to a hollow end region of a lifting rod (13).

2. The hand-held power jigsaw as recited in claim 1, wherein the spacer block (22) has a shaft (222) that travels into the insertion slot (26) and a head (221) situated at the end of the shaft and rests against a stop embodied on the centering piece (18) through the action of a compression spring (23) that rests against the lifting rod (13) at one end and rests against the head (221) at the other end.

3. The hand-held power jigsaw as recited in claim 2, wherein a spacer (24) is provided for indirectly or directly supporting the compression spring (23) against the head (221) of the spacer block (22).

4. The hand-held power jigsaw as recited in claim 1, wherein the shaft (153) of the tool has two laterally protruding dogs (154), wherein the clamping sleeve (20) is embodied as cup-shaped with a cup bottom (201), and the cup bottom (201) has an opening (31) whose larger dimension (y) is slightly greater than a distance (a) between the outer edges of the two dogs (154) that are oriented away from each other and whose smaller dimension (x) is slightly greater than the width (b) of the saw blade shaft (153), but is less than the distance (a) between the outer edges of the dogs.

5. The hand-held power jigsaw as recited in claim 1, wherein the clamping sleeve (20) is closed by means of a sprung cover plate (32) that encompasses the hollow cylinder (181) and is clipped onto a circumferential shoulder (33) embodied on the clamping sleeve (20).

6. The hand-held power jigsaw as recited in claim 1, wherein the clamping elements (19), at least in the region of their body section that protrudes into the insertion slot (26), are provided with insertion bevels (191) that point in the insertion direction of the tool at one end and point in the insertion direction of the spacer block (22) at the other end.

7. The hand-held power jigsaw as recited in claim 1, wherein the clamping spring is embodied in the form of a torsion spring (21) whose spring ends (211, 212) are affixed to the clamping sleeve (20) on the one hand and to the centering piece (18) on the other.

8. The hand-held power jigsaw as recited in claim 1, wherein the outermost end of the spacer block (22) oriented toward the tool is embodied in the form of a wedge.

* * * * *